United States Patent [19]

Ruyak et al.

[11] 4,384,703
[45] May 24, 1983

[54] HANDLE FOR MAGNETICALLY ACTUATED VALVE

[75] Inventors: Robert F. Ruyak, Erie; Larry R. Rosio, Fairview; Theodore R. Silver; Albert E. Straus, both of Erie, all of Pa.

[73] Assignee: Autoclave Engineers, Inc., Erie, Pa.

[21] Appl. No.: 226,650

[22] Filed: Jan. 21, 1981

[51] Int. Cl.³ .............................................. F16K 31/08
[52] U.S. Cl. ...................................... 251/65; 251/288; 137/556.6
[58] Field of Search ........................ 251/65, 286, 288; 137/556.6

[56] References Cited

U.S. PATENT DOCUMENTS 3,360,007 12/1967 Haidek et al. ........................ 251/65
4,284,262 8/1981 Ruyak ................................... 251/65

Primary Examiner—Alan Cohan
Assistant Examiner—John A. Rivell
Attorney, Agent, or Firm—Webb, Burden, Robinson & Webb

[57] ABSTRACT

A handle for a magnetically actuated valve which bears rotating and fixed indicia for reading the valve position. The rotating indicia is placed upon a jacket carrying drive magnets. The fixed indicia is placed upon a cap covering the exposed end of a nonmagnetic bonnet separating the drive and driven magnet assemblies. External stop means prevent rotation of the jacket relative to the cap and bonnet more than about 90°. Internal stop means prevent the rotation of valve and driven magnets more than about 90°.

6 Claims, 7 Drawing Figures

HANDLE FOR MAGNETICALLY ACTUATED VALVE

BACKGROUND

This invention relates to magnetically actuated valves, for example, as described in U.S. patent application Ser. No. 185,005 filed Sept. 8, 1980 entitled "Normally Magnetically Actuated Valve With Novel Nonmagnetic Override" assigned to the same assignee as this patent application. A substantial advantage of magnetically actuated valves is the elimination of the stuffing box which has always been a drawback. However, observation of the stem emerging from the valve interior through the stuffing box, being mechanically linked to the valve closure member, enables the immediate determination of the valve position, i.e., open, closed, etc. With magnetically actuated valves, no valve stem can be observed and thus the valve position cannot be easily read. It is an object of this invention to provide a handle for holding the drive magnet assembly of a magnetically actuated valve and to display the position of the valve for easy reading. It is a further object to provide a magnetically actuated valve handle that will not permit the preselected registry between the handle and the valve closure member to become overridden by force exceeding the static torque supplied by the magnetic fields between the drive and driven magnet assemblies. It is a further object to provide a magnetic valve and handle which together can be panel mounted with only the nonmagnetic bonnet which separates the drive and driven magnet assemblies and the handle on the operator side of the panel. The position or condition of the panel mounted valve with handle in place is easily read no matter what the orientation of the valve housing relative to the panel. It is a still further object of this invention to provide an easily manufactured and assembled handle for a magnetic valve; the parts of which can be injection molded with thermoplastic such as high impact styrene.

SUMMARY OF THE INVENTION

Briefly according to this invention there is provided in the setting of a magnetically actuated valve, an improved handle. The magnetically actuated valve typically comprises a nonmagnetic cylindrical bonnet separating drive and driven magnet assemblies. The handle for the valve according to this invention comprises an outer annular jacket for holding the drive magnets. THe annular jacket has an axial opening extending completely through the jacket such that the jacket may be telescoped over the nonmagnetic bonnet exposing an axial end of the bonnet. A cap is provided for placing over said axial end of the nonmagnetic bonnet which cap bears indicia of open and closed positions of the valve. Indicia on the axial end of the jacket indicate a valve direction to be aligned with the indicia on the cap to bring the valve to opened and closed positions. Preferably stops extend from the cap and the jacket for preventing more than about 90° rotation of the jacket relative to the cap and bonnet. Preferably the jacket comprises two snapped together half-cylindrical sections. Moreover, it is preferred that two axially abutting chambers are provided in the annular jacket; one for receiving the drive magnet assembly and the other for receiving the stops extending from the cap and for holding the stops associated with said jacket. Preferably the two halves are arranged to snap together and are molded of different colors, wherein the demarkation between the two halves provides an indication of a direction. It is preferred that the jacket has an axially extending skirt at the axial end of the jacket away from the indicia wherein the skirt provides means for slidably engaging an annular groove fixed relative to the valve.

THE DRAWINGS

DESCRIPTION OF THE PREFERRED EMBODIMENTS

This invention relates to valves that are opened by a rotation movement of a handle in one angular direction and are closed by the opposite rotation movement. Ball valves and butterfly valves are examples of such valves (see, for example, U.S. Pat. No. 3,747,892 and the co-pending patent application referenced above). The specific embodiment disclosed is a ball valve; however, the invention relates to any valve that may be actuated by stem rotation of less than about one-half turn. Typically ball valves are designed for opening and closing with a one quarter turn. A valve may be designed to open and close with much less and/or with much more than about a one-quarter turn. A one-half turn of a ball valve brings the valve from one position of registry to another position of registry. Hence, a one-half turn is not acceptable for ball valve operation. Typically, valve stops are provided to arrest the ball when it reaches the full registry position and at another rotary position when the ball is fully out of registry.

Figure 1:
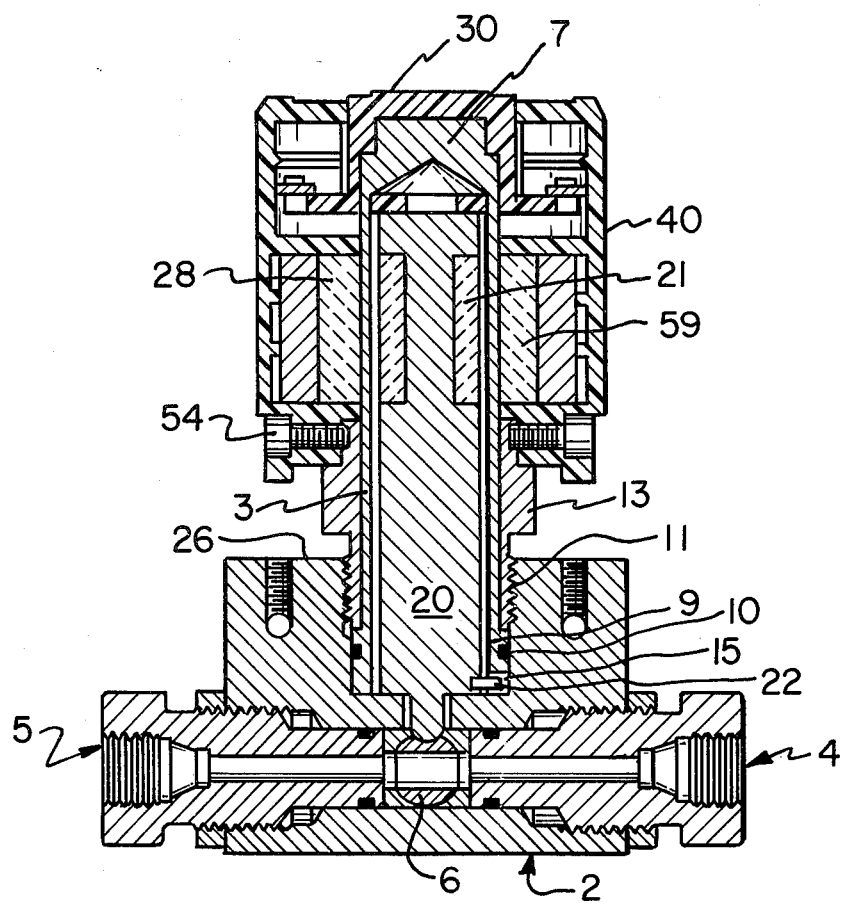
FIG. 1 is a section of magnetically actuated valve and handle for carrying the drive magnets according to this invention.
Figure 2:
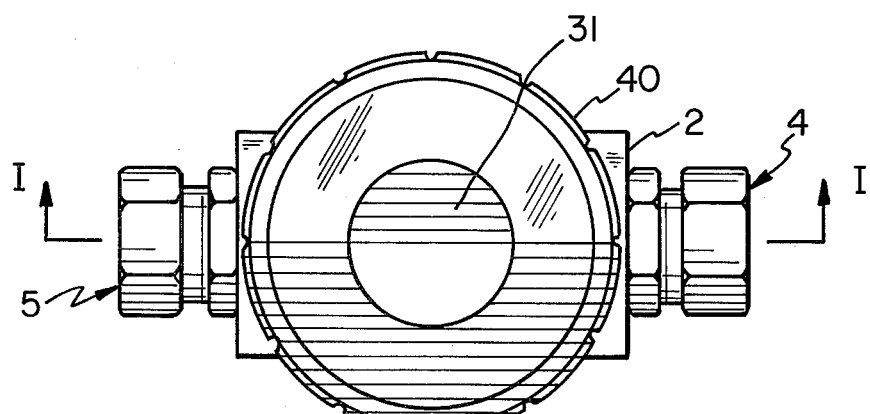
FIG. 2 is a top view of the valve and handle with the section line for FIG. 1 shown as line I—I.

Referring now to FIG. 1, a magnetically actuated valve comprises a steel valve body having a fluid passage portion 2 and a nonmagnetic bonnet 3. In a typical embodiment, the fluid passage portion is arranged with alignment of inlet 4 and outlet 5 ports. The valve body has a central space between the inlet and outlet ports and stopper 6 is positioned within the central space. The stopper is positionable to stop the flow through the valve when a passage in the stopper is not in registry with the inlet and outlet passages connecting to the inlet and outlet ports. The stopper is further positionable to permit flow through the valve when the stopper passage is in registry with the inlet and outlet passages. The nonmagnetic pressurizable bonnet 3 extends away from the central space and has an axis the extension of which passes through the central space.

The bonnet has tubular cylindrical walls having a cylindrical axis transverse to the direction of inlet and outlet passages. The tubular walls of the bonnet are not necessarily integral with the remainder of the valve body. The bonnet 3 has an axial plug 7 at one end sealing off the end away from the fluid passage. The plug may be integral with the bonnet or may be threaded thereto. The plug has at least one flat surface which identifies the angular position of the bonnet as explained hereafter. The flat surface also enables the engagement of the bonnet by a wrench as explained hereafter.

The lower end of the bonnet has a cylindrical flange 9. The fluid passage portion of the valve has a threaded well 11 surrounding an opening between the central passage and the bonnet. The upper portion of the well 10 has internal threads. The lower portion of the well is not threaded but rather has a smooth cylindrical surface. The cylindrical flange 9 on the lower end of the bonnet slides into the smooth portion of the well 11. Typically an O-ring seal 10 is placed therebetween in an appropriate groove. A gland 13 threads into the threaded well to hold the bonnet in place.

The end of the bonnet held within the well has a stop means associated therewith. In the embodiment shown, the bonnet has a 90° cylindrical groove 15 in the inner surface of the bonnet. The groove is oriented in a preestablished way with at least one flat on the external plug of the bonnet. Each radial end of the 90° cylindrical groove in the bonnet comprises a stop for limiting the rotation of a driven magnet assembly relative to the bonnet.

A rotatable driven magnet assembly comprises stem 20 has a portion that engages a stopper 6 at one end and causes the stopper to rotate when the stem is rotated. The stem has driven magnets 21 mounted therein. The stem is disposed for rotation along its axis and the axis of the bonnet 3. An indexing device such as a peg 22 extends radially outward near the end of the stem 20 near the stopper 10. The peg engages the radial stopper surfaces of the 90° cylindrical groove 15 in the bonnet. Thus the rotational travel of the stem 20 is restricted. The stopper surfaces are, of course, positioned such that when the peg 22 abuts one stop surface, the stopper 6 is in a nonregistering or closed position and when the peg abuts the other stop surface the stopper 6 is in a registering or fully open position. Thus the bonnet must be properly oriented with reference to the fluid passage portion. This is possible by providing indexing scribes on the outer surface of the bonnet and the flat face surface 26 of the fluid passage portion or by making use of the at least one flat on the plug end of the bonnet. It should be apparent to those skilled in the art that it would be possible to place the peg 22 in the inner cylindrical surface of the bonnet and to provide the 90° groove within the stem 20 of the driven magnet assembly.

A drive magnet assembly comprises annular magnets 28 that telescope over the nonmagnetic bonnet and when turned carry driven magnet assembly and stopper into rotation by the action of the magnetic fields extending through the nonmagnetic bonnet. To this point, the magnetic valve (including nonmagnetic bonnet, drive and driven magnet assemblies) which has been described is substantially the same as described in copending application Ser. No. 185,005 referenced above.

Figure 3:
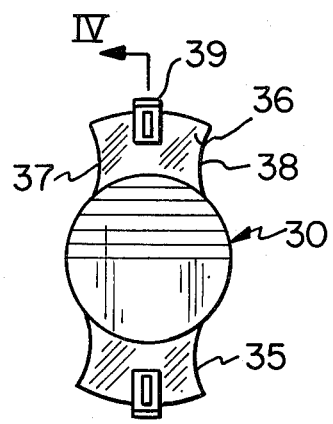
FIG. 3 is a top view of a bonnet cap described herein.
Figure 4:
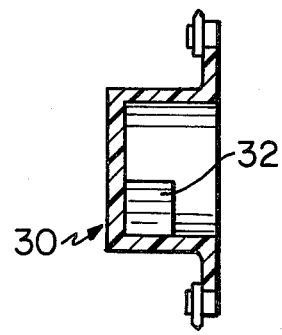
FIG. 4 is a section view of a bonnet cap as taken along lines IV—IV of FIG. 3.
Figure 5:
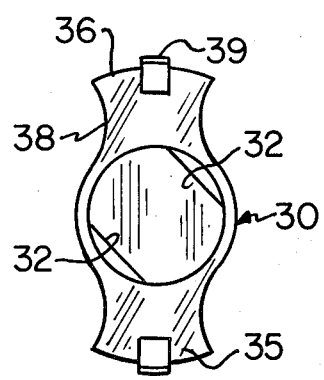
FIG. 5 is a bottom view of the bonnet cap as shown in top view in FIG. 3.

Referring now to FIGS. 3, 4, and 5, there is illustrated a cap 30. The cap 30 has a cylindrical wall with an inner diameter just sufficient to tightly slide over the plug end of the nonmagnetic bonnet 3. The top 31 of the cap bears indicia of the direction of the opened and closed positions of the valve. The cap is keyed to flats on the end of the magnetic bonnet. The keys 32 can be seen in the bottom view of the cap shown in FIG. 5.

Extending radially outward of the cylindrical side walls of the cap are two tabs 35, 36. One tab only is essential. Each tab has a sector shape with generally radial edges 37, 38 arranged as stop edges for engaging cooperating stops on the jacket (to be described). In the case of two tabs, two radial lines pass through the edges of the two tabs which are arranged on opposite sides of the cap. The angle between the two radial lines may vary according to the particular design and as shown in the figures is approximately 45°.

It may also be desired to provide snap tab extensions 39 on the outer circumferential edges of the tabs 35, 36 for holding the jacket axially relative to the cap at least prior to assembly upon the bonnet. (When the cap and jacket are assembled upon the bonnet, the cap is held stationary by its friction fit upon the bonnet and the jacket is held in position by the magnetc fields).

Figure 6:
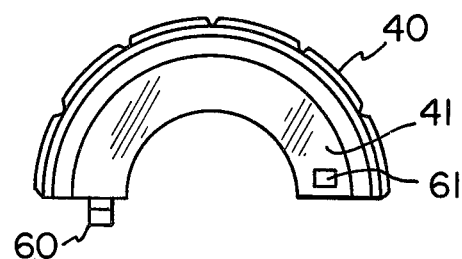
FIG. 6 is a top view of one of two substantially identical portions that snap together to form the jacket of the handle and drive magnet assembly as described herein.
Figure 7:
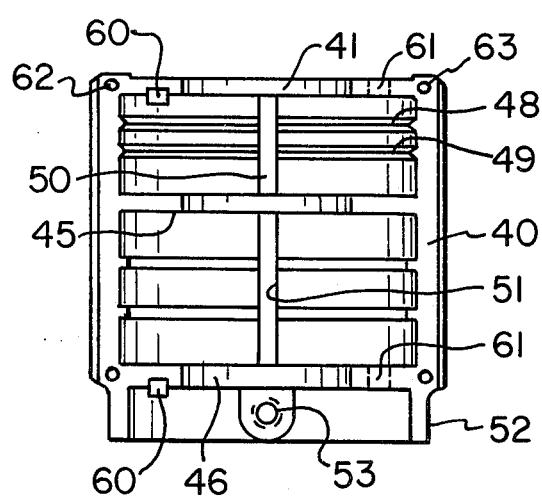
FIG. 7 is a side view of one of the items shown also in FIG. 6 looking into the inside thereof.

Referring now to FIGS. 6 and 7, there is illustrated a half-cylindrical section comprising one half of the jacket. The jacket comprises a cylindrical outer wall 40, an annular radial end wall 41 at one axial end upon which indicia are located, and two annular radial partition walls, 45, 46 which divide the jacket into two axially abutting compartments. The compartment between the end wall and central partition wall 45 provides a space for receiving the cap 30 and the tabs 35, 36 extending radially outward therefrom. On the inner cylindrical surface of the cap compartment are two circumferential ridges 48, 49. The ridges cooperate with the snap tabs 39 on the tabs extending from the cap to axially position the cap and jacket. The snap tabs give with finger pressure and can be snapped passed the ridges for axial positioning if need be. Also, on opposite sides of the inner cylindrical surface of the cap compartment are two stop flanges 50 extending radially inward. Generally speaking the stop flanges lie in a plane including the cylindrical axis of the jacket.

The partition walls 45 and 46 along with the cylindrical wall of the jacket define a drive magnet compartment. The magnets are oriented relative to the indicia on the jacket by a flange 51 on at least one side of the jacket which flanges engages an indexing slot or slots on the outer cylindrical surface of the drive magnet assembly.

The jacket may have a skirt portion 52 extending away from the magnet compartment. The skirt portion may support a threaded bore 53 into which securing screws 54 may be turned. The securing screws are arranged to slide in a circumferential groove in the gland 13. The securing screws prevent the easy removal of the jacket and drive magnets from the bonnet. Magnetic forces will keep the jacket and drive magnets in place and the securing screws are only necessary to make removal of the jacket a little more difficult thus requiring more deliberation on the part of the operator prior to removing the jacket.

Where the jacket is made of two half-cylinder shapes as shown in FIGS. 6 and 7 locking pawls 60 and recesses 61 hold the two halves together. The half-cylinder shapes may be keyed together as by mating rods 62 and holes 63 on the abutting surfaces.

According to a preferred embodiment, each cylinder half of the jacket is fabricated of a different color plastic. Thus the demarkation between the two halves defines a line indicator.

Any number of detailed angular arrangements of stops and indicia on the drive magnet assembly (the jacket), the bonnet (the cap), and the drive magnet assembly are possible. Described here is the particular arrangement for a four pole magnet embodiment. Consider first the driven magnet assembly comprising the driven magnet, valve stem, peg and ball stopper with passage therein: the four pole driven magnet is divided into four equal quadrants of alternating north and south poles. The poles are thus separated with two perpendicular lines (actually planes) one of which is taken as a reference line (hereafter the "first reference line") from which all angles of rotation on the driven magnet assembly are measured. The passage in the ball valve closure element is aligned with the first reference line as is the stop peg 22.

The reference line from which angles are defined for the bonnet and valve body (hereafter the "second reference line") is the axis of the inlet and outlet passages. The bonnet is provided with indicia on the top thereof which aligns with the second reference line (axis joining the inlet and outlet passages). This indicia is provided on the cap which is keyed to the plug end of the bonnet. The cap carries the indicia and thus the cap must be keyed to the bonnet so as not to rotate out of aligment. Preferably the flats on the top of the bonnet are perpendicular to the direction of the second reference line. The groove 15 in the bottom of the bonnet through which the peg travels has two radial ends comprising stops. One end is substantially aligned with the second reference line and abuts the peg 22 on the driven magnet assembly when the passage in the ball is aligned with the inlet and outlet axis. The other stop is substantially 90° from the second reference line and abuts the peg when the ball is rotated about 90° so that the passage is perpendicular to the axis between the inlet and the outlet.

The drive magnet assembly (jacket) also contains a four pole cylindrical magnet with alternating north and south poles in equal quadrants. The quadrants are thus divided by perpendicular lines (actually planes) with one line selected as the reference line for the drive magnet assembly (hereafter the "third reference line"). (If the second reference line for the driven magnet has a north pole in the quadrants immediately clockwise therefrom then the third reference line for the drive magnet has a south pole in the quadrants immediately clockwise therefrom). The indicia in the drive magnet assembly (jacket) indicates the direction of the third reference line. The drive magnet assembly has stops 50 associated therewith that are 90° from the third reference line on both sides thereof.

The cap (fixed relative to the bonnet) has two radial tabs 35, 36 extending from the cap. The tabs each have two radial stop surfaces. One stop surface on each tab is substantially aligned with the third reference line and abuts a stop 50 on the drive magnet assembly when the valve is in the closed position. The other stop surface on each tab is about 45° from the third reference line and abuts the other stop on the drive magnet assembly when the valve is near the open position. The tabs are in a quadrant clockwise of the third reference line.

The bolt holes fastening the surface of the valve body define a plane including the inlet and outlet passages. Since at least the bolts extend through a panel upon which the valve body may be mounted but are usually hidden by the drive magnet assembly, the direction of flow through the valve may be determined from the control room side of the panel by observation of the bolts if the drive magnet assembly is removed. Hence, proper alignment of the bonnet and the valve body can be checked when the valve is installed upon a panel simply by removing the drive magnet assembly (the jacket) and the cap and then comparing the flats on the plug end of the bonnet with an imaginary line joining the bolt heads. For normal operation, the flats have an edge perpendicular to the line joining the bolt heads.

The handle may be removed from time to time. It is essential that it be accurately reinstalled with the flats 32 against the flat surfaces on the bonnet. The ridges 48 and tabs 35, 36 help to make the correct alignment. As the handle is telescoped back upon the bonnet or as it is drawn over the bonnet by the magnetic forces, if the flats 32 are not aligned the cap 30 will pop up and out of the handle. The tabs 35, 36 will be forced past the ridges 48. The alignment is then easily accomplished by rotating the cap until it will slide down over the bonnet. The tabs 35, 36 again will be forced over ridge 48.

Having thus described the invention with the detail and particularity required by the Patent Laws, what is desired protected by Letters Patent is set forth in the following claims.

We claim:

1. In a magnetically actuated valve comprising a cylindrical nonmagnetic bonnet separating drive and driven magnets, a handle for said valve comprising an annular jacket for holding the drive magnets, said annular jacket having an axial opening extending completely through the jacket such that the jacket may be telescoped over the nonmagnetic bonnet exposing an axial end of the bonnet, a cap for placing over said axial end of the nonmagnetic bonnet bearing indicia of opened and closed positions of the valve, an axial end of the jacket bearing indicia indicating a valve direction for alignment with the indicia on the cap to bring the valve into opened and closed positions and stops extending from said cap and said jacket for preventing more than about 90° rotation of said jacket relative to said cap and bonnet.

2. The handle according to claim 1 wherein said jacket comprises two snap together halves.

3. The handle according to claim 2 comprising two axially abutting annular chambers one for receiving the drive magnet and the other for receiving the stops extending from the caps are defined by radially extending annular walls.

4. The handle according to claim 2 wherein the snap together halves are injected molded plastic of different colors or other various visual indicators.

5. The handle according to claim 3 wherein the handle has an axially extending skirt on the end of the jacket away from the indicia, said skirt having means for slidably engaging an annular groove fixed relative to the valve.

6. In a magnetically actuated valve comprising a nonmagnetic cylindrical bonnet, a driven magnet assembly within the bonnet and a driving magnet assembly without the bonnet the improvement comprising means for positioning the driving magnets including
   a cylindrical cap for sliding over an axial end of the cylindrical bonnet, said cap having means for keying the cap to the cylindrical bonnet to prevent relative rotation thereof, indicia on the axial end of the cap indicating the open position of the valve, two radial stop tabs extending from said cap each tab having two radial stop surfaces,
   a housing for said drive magnets comprising a cylinder having a diameter greater than the outer diameter of the drive magnets, the housing having an annular end face and two annular partitions, the two annular partitions and the cylindrical housing defining a first space for receiving the cylindrical drive magnets, a rib extending radially into said first space for keying the magnets in a preselected position, one of said radial partitions and the annular end face defining a second space for receiving the tabs extending from the caps, ribs extending radially into said second space for engaging the stop surfaces of the tabs extending from said cap whereby the stop surfaces of the stop tabs are shaped and positioned with the stop ribs to restrict the annular rotation of the jacket relative to the cap and indicia on said end face indicative of position whereby comparison of the indicia on the cap and the end face provide for easy reading of the valve position.

* * * * *